United States Patent [19]
Harris

[11] 3,936,723
[45] Feb. 3, 1976

[54] BATTERY CHARGING SYSTEMS FOR USE IN ROAD VEHICLES

[75] Inventor: Paul Anthony Harris, Walsall, England

[73] Assignee: The Lucas Electrical Company Limited, Birmingham, England

[22] Filed: May 8, 1973

[21] Appl. No.: 358,321

[30] Foreign Application Priority Data
May 20, 1972 United Kingdom............... 23833/72

[52] U.S. Cl. ...................... 322/28; 320/59; 320/61
[51] Int. Cl.² ........................................... H02P 9/26
[58] Field of Search .................. 322/28; 320/59, 61

[56] References Cited
UNITED STATES PATENTS

| | | |
|---|---|---|
| 3,315,141 | 4/1967 | Wright et al...................... 322/28 X |
| 3,617,852 | 11/1971 | Phoenix............................ 322/28 X |
| 3,670,229 | 6/1972 | Harris............................... 322/28 X |

Primary Examiner—James D. Trammell
Attorney, Agent, or Firm—Holman & Stern

[57] ABSTRACT

A battery charging system for a road vehicle has a permanent magnet alternator with at least three separate single phase windings, as distinct from the usual three-phase winding. Each of the separate windings is connected to a pair of supply lines through a pair of diodes and a pair of thyristors, each winding having its own pair of diodes and pair of thyristors. The thyristors are controlled in accordance with the battery voltage.

1 Claim, 1 Drawing Figure

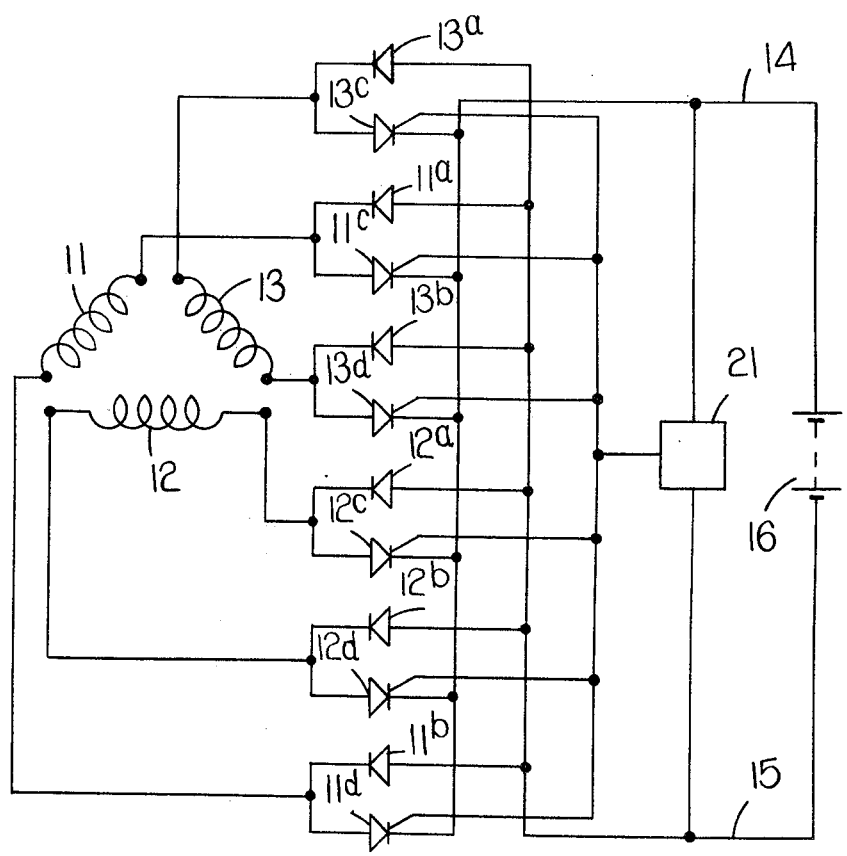

BATTERY CHARGING SYSTEMS FOR USE IN ROAD VEHICLES

This invention relates to battery charging systems, particularly for use in road vehicles.

A system according to the invention comprises in combination a permanent magnet alternator having at least three separate single phase windings, positive and negative supply lines for connection to a vehicle battery, and a plurality of pairs of diodes and pairs of thyristors, there being one pair of diodes and one pair of thyristors for each winding, and each winding having its ends connected to the negative supply line through its pair of diodes respectively, and its ends further connected to the positive supply line through its pair of thyristors respectively, the system further including voltage sensitive means connected between the supply lines for providing gate current to the thyristors only when the voltage between the supply lines is below a predetermined value.

The accompanying drawing is a circuit diagram illustrating one example of the invention.

Referring to the drawing, there is provided a permanent magnet alternator having three separate single phase windings 11, 12 and 13. The battery charging system further includes positive and negative supply lines 14, 15 between which the vehicle battery 16 is connected. The windings are wound on the stator in the same way as a delta-connected winding, but their ends are not connected to each other.

The winding 11 has its ends connected to the line 15 through a pair of diodes 11a, 11b respectively, and its ends further connected to the line 14 through a pair of thyristors 11c, 11d. In similar fashion, the windings 12 and 13 have their ends connected to the lines 14 and 15 through associated diodes and thyristors 12a, 12b, 12c, 12d, 13a, 13b, 13c, 13d.

The system further includes a voltage sensitive circuit 21 which is connected between the lines 14, 15 and which produces an output to the gates of the thyristors when the voltage between the lines 14, 15 is below a predetermined value. The circuit 21 can be of any convenient known form, and conveniently incorporates a Zener diode for sensing the voltage between the lines 14, 15, together with a transistor amplifier controlled by the Zener diode.

The arrangement is such that as long as the voltage between the lines 14, 15 is below a predetermined value, all the thyristors are provided with gate current, and the output from the windings 11, 12, 13 is rectified and supplied to the battery 16. However, with the voltage between the lines 14, 15 above the predetermined value, then the output from the circuit 21 is no longer present, and each of the thyristors will turn off as soon as it is reverse biased. No output is then provided to the battery 16.

The arrangement shown is more elaborate than is theoretically required for an arrangement of this kind, since in theory a three phase alternator could be used with only three diodes and three thyristors providing the required output. However, with such an arrangement, which is known, then because a thyristor only turns off when its anode becomes negative with respect to its cathode, it is possible for an unregulated supply to be fed to a load if the battery 16 should become disconnected for any reason. The reason for this is that each thyristor can conduct current from two phase windings, and so it is possible at high alternator speeds for the thyristors not to have time to turn off, so that continuous conduction occurs. Using the arrangement shown, in which each of the windings has two thyristors associated with it, then since both of the thyristors associated with a winding require to be conducting for a supply to be fed to the battery 16, and of course to any loads in parallel with the battery 16, then in the event that there is a fault, the system will switch off because each thyristor has a half cycle of machine voltage to turn off. Moreover, although the number of semi-conductors used in the rectifier has been doubled, the rectifier will not in fact be any more expensive, because the devices used in the rectifier will only need to be rated at half the level of a normal rectifier using thyristors, so that far cheaper devices can be used.

I claim:

1. A battery charging system comprising in combination a permanent magnet alternator having at least three separate single phase windings, positive and negative supply lines for connection to a vehicle battery, and a plurality of pairs of diodes and pairs of thyristors, there being one pair of diodes and one pair of thyristors for each winding, and each winding having its ends connected to the negative supply line through its pair of diodes respectively, and its ends further connected to the positive supply line through its pair of thyristors respectively, the system further including voltage sensitive means connected between the supply lines for providing gate current to the thyristors only when the voltage between the supply lines is below a predetermined value.

* * * * *